(12) United States Patent
Tanaka et al.

(10) Patent No.: US 6,239,570 B1
(45) Date of Patent: May 29, 2001

(54) WIPER CONTROLLER APPARATUS OF WATER DROP SENSITIVE TYPE

(75) Inventors: Shuhei Tanaka; Tadashi Koyama; Keiji Tsunetomo, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/211,286

(22) Filed: Dec. 16, 1998

(30) Foreign Application Priority Data

Dec. 17, 1997 (JP) .................................................. 9-347748
Dec. 17, 1997 (JP) .................................................. 9-347749

(51) Int. Cl.[7] .................................. H02P 3/00; H02P 7/00
(52) U.S. Cl. ..................... 318/483; 318/480; 318/DIG. 2
(58) Field of Search .................................. 318/281–282, 318/480, 483, DIG. 2

(56) References Cited

U.S. PATENT DOCUMENTS 5,073,722 * 12/1991 Tohge et al. .......................... 307/10.1
5,726,547 * 3/1998 Reime .................................. 318/483

FOREIGN PATENT DOCUMENTS 2-67945    3/1990 (JP) .

* cited by examiner

*Primary Examiner*—Robert E. Nappi
*Assistant Examiner*—Marlon T. Fletcher
(74) *Attorney, Agent, or Firm*—Pillsbury Madison & Sutro LLP

(57) ABSTRACT

A wiper controller apparatus of the water drop sensitive type comprises: light emitting means 7 for guiding light into a window glass so as to undergo total internal reflection within said window glass; light receiving means 8 for receiving the light which has undergone total internal reflection within said window glass; means for detecting the amount of water drops adhered or present upon an outside surface of said window glass based on an output of said light receiving means, and for driving a wiper thereupon; wherein the apparatus further comprises wiper driving means 18 for driving the wiper again by only one cycle if a time interval from an initiation of said wiper action exceeds a predetermined time. The apparatus further comprises anther wiper driving means 18 for driving said wiper when the signal duration time of the output signal S1 of said light receiving means 8 is equal to or greater than a predetermined time.

1 Claim, 7 Drawing Sheets

WIPER CONTROLLER APPARATUS OF WATER DROP SENSITIVE TYPE

BACKGROUND OF THE INVENTION

1. Field of the Invention

The present invention relates to a wiper controller apparatus of the water drop sensitive type for detecting a condition or amount or volume of water drops adhered to or present upon a surface of a window glass so as to drive the wiper, by using a light emitting element and a light receiving element.

2. Description of Prior Art

A conventional controller apparatus of the water drop sensitive type as disclosed in Japanese Patent Laid-Open No. Hei 2-67945 (1990) is already known. In this prior art document, light means (i.e., light emitting means) and detection means (i.e., light receiving means) are positioned upon an inside surface of a window glass, opposing to each other at a distance, within a wiping area of a wiper wiping an outside surface of the window glass, and the adhesion or presence of the water drops upon the outside surface of the window glass is decided or detected on the basis of a difference between output signal levels generated from the detection means before and after driving of the wiper, so as to drive the wiper. When the output signal of the detection means reaches a certain reference level, the wiper starts to be driven, while it is stopped when the output signal of the detection means falls to be less or lower than aforesaid reference level.

However, with the conventional wiper controller apparatus of the water drop sensitive type, it is impossible to remove or wipe any water drops, present, for example, due to rain, still adhered to or present upon the window glass in such an amount or volume that the output signal of the detection means does not reach the predetermined reference level, in particular after the stopping of rain, since the wiper stop being driven immediately after the output signal of the detection means came to be lower than the reference level. Further, there is also a possibility that any rain drops (water drops) adhered or present upon the window glass without being detected by the detection means may shift or slide down on the window glass (especially, for example, the front windshield of an automobile) into a view region or area other than that that is wiped by the wiper.

In particular in a case where the output signal of the detection means does not reach the reference level, there is still another drawback in that the wiper must be driven by being manually switched on again, since it does not operate automatically.

Further, with the conventional wiper controller apparatus of the water drop sensitive type, the wiper is automatically driven when the output signal from the detection means reaches the predetermined level. Therefore, it has a further drawback in that the wiper can be driven erroneously by the incidence of noise or ambient light from outside, which changes abruptly (in particular, pulse-like light) or that is caused due to the shadow of trees, buildings, tunnels and so on.

Moreover, there is another drawback in that the wiper may be accidentally driven due to electromagnetic noise or radio waves generated by such devices as VICS, mobile phones (car phones), other radio apparatus, or generated from the ignition coil of an automobile's engine, which are incident as noise upon the detection means.

SUMMARY OF THE INVENTION

For resolving the above-mentioned drawbacks, according to the present invention, there is provided a wiper controller apparatus of the water drop sensitive type, comprising: light emitting means for guiding light into a window glass so as to undergo total internal reflection within said window glass; light receiving means for receiving the light which has undergone total internal reflection within said window glass; means for detecting the amount of water drops adhered or present upon an outside surface of said window glass based on an output signal of said light receiving means, and for driving a wiper thereupon; and the apparatus further comprises, wiper driving means for driving said wiper again by only one cycle if a time interval from an initiation of said wiper exceeds a predetermined time.

Thereby, the wiper is automatically driven on the assumption that rain drops are adhered or present upon the front glass in an amount insufficient to cause the initiating of the wiper, and that rain drops not detected by the sensor have slid down into the view region of the front glass from regions other than the wiping area wiped by the wiper. Therefore, when only a few water drops are adhered to or present upon the front glass, they can be automatically wiped off.

Further, according to the present invention, there is also provided a wiper controller apparatus of the water drop sensitive type, comprising: light emitting means for guiding light into a window glass so as to undergo total internal reflection within said window glass; light receiving means for receiving the light which has undergone total internal reflection within said window glass; means for detecting the amount of water drops adhered or present upon an outside surface of said window glass based on an output signal of said light receiving means, and for driving a wiper thereupon; and further, wiper driving means for driving said wiper again by only one cycle, in the case where said wiper has been first driven by only one cycle, if a predetermined time has passed after said first driving cycle thereof.

With this arrangement, the wiper is automatically again driven by only one more cycle after a predetermined time has elapsed, even in the case where the wiper has first been driven by only one cycle after initiation thereof due to only a small amount of water drops being present. Therefore, it is possible to wipe up the water drops that are adhered to or present upon the front glass at a level not sufficient to initiate the driving of the wiper, with certainty, in particular after the raining stops.

Furthermore, according to the present invention, there is also provided a wiper controller apparatus of the water drop sensitive type, comprising: light emitting means for guiding light into a window glass so as to undergo total internal reflection within said window glass; light receiving means for receiving the light which has undergone total internal reflection within said window glass; means for detecting the amount of water drops adhered or present upon an outside surface of said window glass based on an output signal of said light receiving means, and for driving a wiper thereupon; and further, wiper driving means for driving said wiper when the signal duration time of the output signal of said light receiving means is equal to or greater than a predetermined time.

According to this arrangement, with the provision of the wiper driving means for driving said wiper when the signal duration time of the output signal of said light receiving means is equal to or greater than a predetermined time, it is possible to drive the wiper and quickly respond to the condition of the water drops being adhered or present upon the window glass, free from any interference from noise due to ambient light and/or external electromagnetic waves, changing the signal duration time thereof to a time period less or shorter than the predetermined time.

DETAILED DESCRIPTION OF PREFERRED EMBODIMENTS

Hereinafter, embodiments according to the present invention will be fully explained by referring to the attached drawings.

Figure 1:
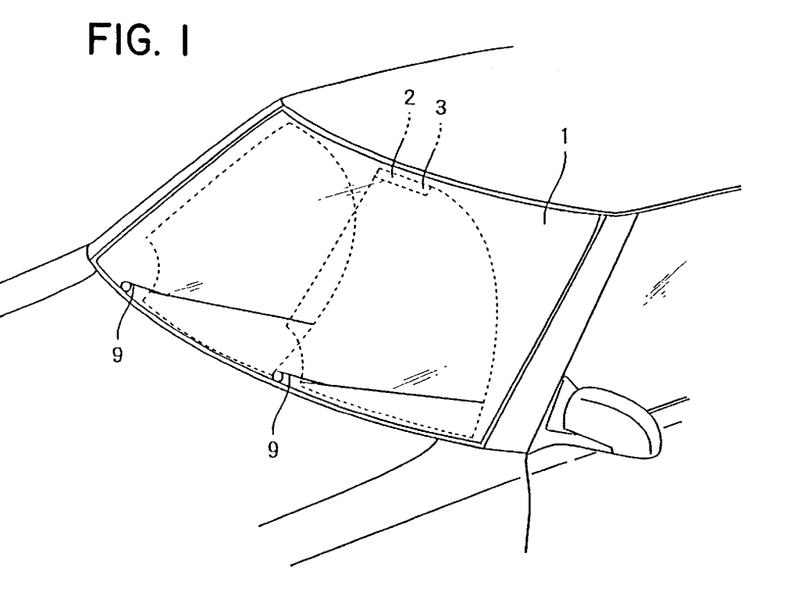
FIG. 1 shows a perspective view of a front portion of an automobile to which a wiper controller apparatus of the water drop sensitive type according to the present invention is applied.
Figure 2:
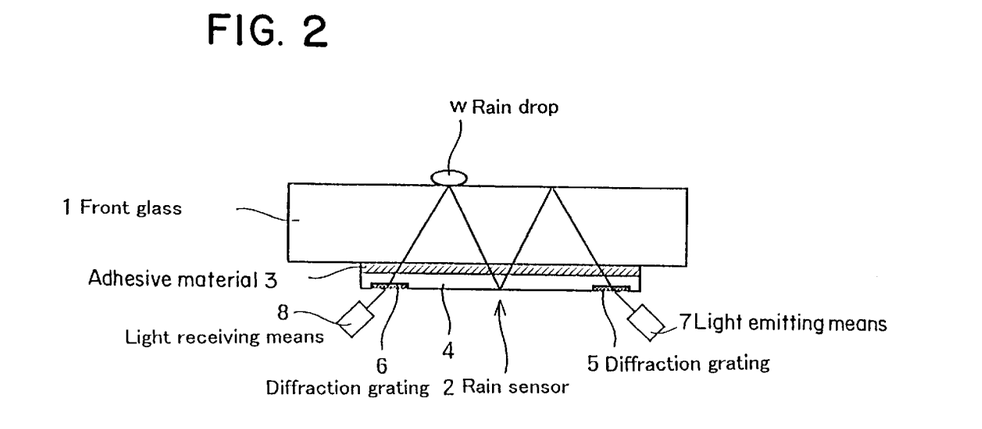
FIG. 2 shows a construction of a rain sensor.

Referring to FIG. 1, a rain sensor 2 is attached upon an interior surface of the front window glass (windshield) 1 of an automobile with adhesive material (for example, adhesive tape) 3, located within a wiping area or region of one or more wipers 9 which wipe an outside surface thereof. The adhesive material (adhesive tape) 3 is selected to have a refractive index that is nearly equal to that of the window glass (i.e., 1.48). Further, as the window glass, there is used a soda lime glass containing mainly $SiO_2$, at a thickness of 5 mm. The rain sensor 2 comprises, as shown in FIG. 2, diffraction gratings 5 and 6 which are formed on a surface of a glass substrate 4 by the laser light. The adhesive material 3 is pasted all over the surface of the glass substrate 4 so as to closely contact the rain sensor 2 onto the front glass 1.

Further, in a vicinity of diffraction grating 5, there is provided light emitting means 7 comprising a light emitting element such as a light emitting diode (LED) or a laser diode (LD), while in a vicinity of diffraction grating 6, there is provided a light receiving means 8 comprising a light receiving element such as a photo diode (PD). Light emitting means 7 and light receiving means 8 may be provided closely contacted with the diffraction gratings 5 and 6, respectively. Also, the diffraction gratings 5 and 6 are preferably formed by an ablation phenomenon which is caused by irradiation of a laser beam upon the surface of the glass substrate 4.

Figure 3:
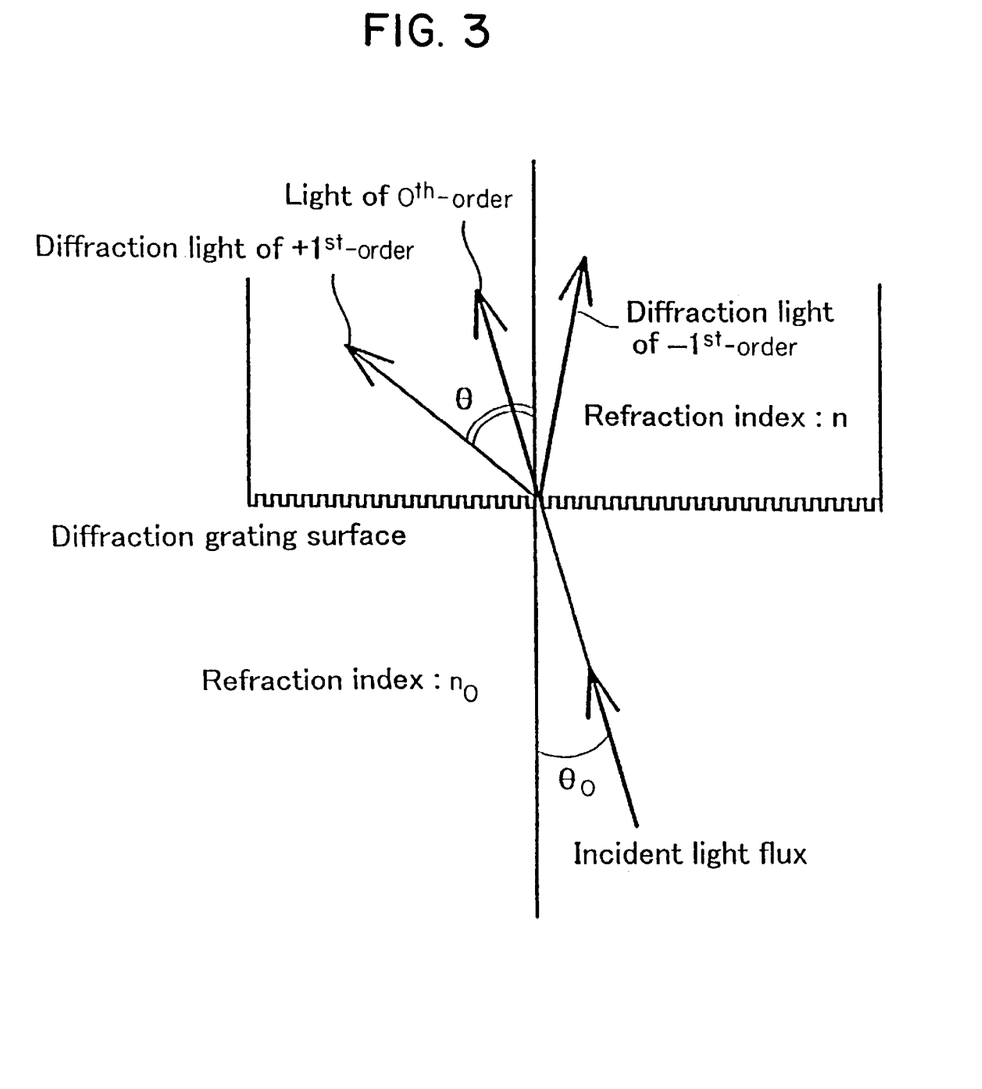
FIG. 3 shows an explanatory view of the function of a diffraction grating.

The diffraction gratings here comprise optical elements, such as minute or fine grooves that are formed on the surface of the glass substrate. Ideally, the diffraction grating is designed to have a groove pitch ranging between 0.4–3 $\mu$m, depending upon various uses or purposes thereof. Diffraction gratings are mainly used to obtain a spectrum, and can also be used to divide or bend light by diffracting light, in particular in a case where monochromatic light is used as a light source. Further, as a diffraction grating other than that mentioned above, other types of diffraction gratings may also be adopted, such as those of the reflection type, a type which comprises a slit in shape thereof, and further a type in which the refractive index thereof is varied periodically. The function which is utilized by the present invention is a phenomenon of the diffraction grating, wherein the diffraction light appears on a constant rule in the case where monochromatic light is incident thereupon. As the diffraction light, as is shown in FIG. 3, a primary ($1^{st}$ order) diffraction lobe is generated at a constant angle with respect to the incident light. Further, though diffraction lobes of higher orders are also generated, the primary diffraction light is mainly used because the higher ones have less light (i.e. are weaker in intensity). When light is incident on a surface, the relationship in angles between the incident light and the diffraction light can be expressed by the following equation (1). Namely, assuming that the angle of the incident light is $\theta_0$, the angle of $M^{th}$ order $\theta$, the wavelength of the incident light $\lambda$, the pitch of the grooves d, the refractive index of the medium at the exit side n, and the refractive index of the medium at the incident side $n_0$, then the angular relationship can be expressed as follows:

$$n \cdot \sin\theta - n_0 \cdot \sin\theta_0 = m\lambda/d (m=0, \pm1, \pm2, \dots) \qquad (1)$$

In the case where the medium of the incident side is air and a transparent glass plate is the medium at the exit side, the refractive index of air being ($n_0=1.0$), equation (1) clearly shows that the angle of the light traveling within the transparent plate can be adjusted by changing the incident angle of the light which is incident upon the diffraction grating. As mentioned above, by using a diffraction grating, it is possible to introduce light into the transparent plate at an arbitrary angle. Further, by appropriately selecting the incident angle onto the diffraction grating, it is also possible to have the introduced light undergo total internal reflection within the transparent plate. Further, upon the basis of the same principle, it is also possible to have the light undergoing the total internal reflection within the transparent plate to exit to the outside, from within the transparent plate into the surrounding air.

Moreover, for obtaining an incident angle at which the total internal reflection is initiated upon the boundary surface between the air and the glass, i.e., a critical angle, the following calculation was conducted using Snell's law. Snell's law can be expressed by the following general equation (2):

$$n_0 \cdot \sin\alpha_0 = n \cdot \sin\alpha \qquad (2)$$

where $\alpha$ and $\alpha_0$ are the incident and the refracting angles with respect to a normal line at the boundary between surfaces of materials having refractive indexes n and $n_0$ ($\alpha$: incident angle, $\alpha_0$: refraction angle).

Assuming that the refractive index of the front windshield glass is n=1.48 and the refractive index of air is $n_0=1$, as is mentioned above, then the condition to obtain total internal reflection inside the glass plate can be determined, and $\alpha=42.5°$ from equation (2) since $\alpha_0=42.5°$. Accordingly, total internal reflection occurs within the medium of the front windshield glass if the incident angle $\alpha$ is equal to or greater than the angle 42.5°. Further, in a case where water is present upon or adhered to the window glass, the value of a $\alpha=64.0°$ can be obtained from a similar calculation for obtaining total internal reflection within the glass by assuming that the refractive index of water is $n_0=1.33°$. Accordingly, within the region of incident angles of $\alpha$ from 42.5° up to 64.0°, total internal reflection occurs within the glass if no water is adhered to nor present upon the glass, while it does not occur within the glass if water is adhered or present thereupon. Therefore, within this range, no light traveling within the glass escapes outside through the water. For causing this reflection, the incident angle of the diffraction grating is adjusted. Namely, the incident angle upon the diffraction grating is calculated so as to obtain a reflection angle of 42.5° within the glass by using the above-mentioned equation (1). For a diffraction grating having a groove pitch d of 1020 nm formed on the glass surface, an incident angle of 22° can be obtained when using the primary plus (+$1^{st}$ order) diffraction light lobe from a laser beam having a wavelength 633 nm emitted from a He—Ne laser.

Further, for obtaining the reflection angle 64.0° within the glass, it is apparent that the incident angle upon the diffraction grating is 45° from the same calculation. In the present embodiment, the light is incident upon the diffraction grating 5 at an angle 45°. This light, which has undergone the total internal reflection at this time, exits from the other diffraction grating 6.

Moreover, in the case where water drops W are present at plural points of total internal reflection, the light exiting from the diffraction grating 6 will be reduced in intensity, in particular when water drops are adhered to or present upon a large number of total internal reflection points, then the output light is reduced by about 1/50. Note only one water drop W is shown in FIG. 2, although the number is actually more than 1. It can be confirmed that the presence of water on the surface of the glass can be detected with sufficient sensitivity and is reflected in the strength of the exiting light. Further, when the incident angle upon the diffraction grating is increased gradually, the same phenomenon also occurs.

However, if the incident angle comes to be greater than 64°, even though water drops adhered or present upon the points of total internal reflection, the exiting light does not change in intensity. This angle almost corresponds with the angle at which the condition of total internal reflection does not change irrespective of adhesion of presence of the water drops.

Figure 4:
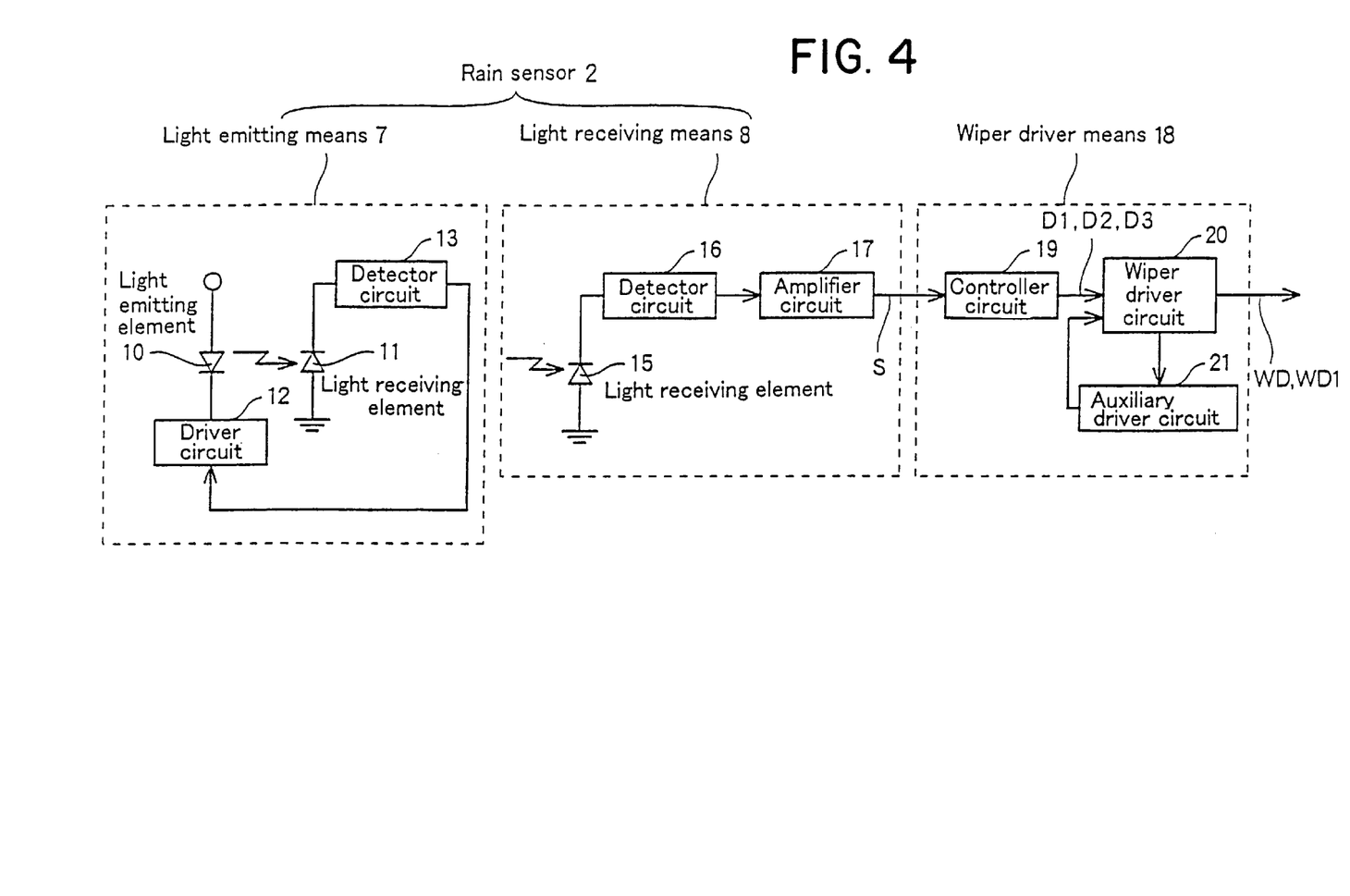
FIG. 4 shows the structure of the wiper controller apparatus of the water drop sensitive type according to the present invention.

First of all, according to the present invention, for purpose of driving the wiper (or wipers—2 are shown in FIG. 1) on the assumption that rain drops are adhered or present upon the front glass in an amount or volume insufficient to initiate the wiper, and/or that some rain drops not detected by the sensor have slid down into the view area (a view area through which a driver or passenger must see) of the front glass from a region other than the wiping region by the wiper, the wiper controller apparatus comprises, as shown in FIG. 4, a rain sensor 2 having a light emitting means for guiding or introducing the light into the front glass 1 in such a manner that it undergoes total internal reflection upon the inside surfaces thereof, a light receiving means 8 for receiving the light reflected within the front glass 1, and a wiper driver means 18 for driving the wiper 9 at a desired velocity based upon an output signal of the light receiving means 8.

The light emitting means 7 comprises a light emitting element 10 such as a LED, LD and so on, a light receiving element 11 for detecting the light output from the light emitting element 10, such as a PD and so on, a driver circuit 12 for making the light emitting element 10 output a light beam modulated with a predetermined frequency, and a detector circuit 13 for receiving a signal corresponding to the modified component from the output light of the light receiving element 11. Also, the output signal of the detector circuit 13 is fed back to the driver circuit 12.

In the light emitting means 7, since the signal corresponding to the modified component is received from the output signal of the light receiving element 11 by the detector circuit 13 and is fed back to the driver circuit 12 of the light emitting element 10, the output of light emission by the light emitting element 10 can be controlled to a desired value, and the output of light by the light emitting element 10 can be maintained at a desired value irrespective of any change in the ambient temperature of the light emitting means 7. Further, the light receiving means 8 comprises a light receiving element 15 such as a PD and so on, a detector circuit 16 for taking out or receiving the signal corresponding to the modified component by the driver circuit 12 of the light emitting means 10, and an amplifier circuit 17 for amplifying an output signal of the detector circuit 16.

Since the detector circuit 16 takes out or receives only the signal corresponding to the modified component generated at the light emitting means 10 from the output signal of the light receiving element 15 to be input into the wiper driver apparatus 20 through the amplifier circuit 17 and the controller circuit 19, the wiper controller apparatus will never be operated erroneously, even under the influence of outside ambient light, which can sometimes reach 150,000 lux under strong sunlight in mid-summer, though it may be only a few lux in darkness at midnight. The wiper driving means 18 comprises a controller circuit 19 for producing a desired signal from the output signal of the amplifier circuit 17, a wiper driver circuit 20 for converting the output signal of the controller circuit 19 into a wiper driving signal WD for driving the wiper(s) 9 at a desired velocity to be outputted to a wiper driving mechanism (not shown in the figure), and an auxiliary driver circuit 21 for making the wiper driver circuit 20 output a wiper driving signal WD1 that controls the wiper driving mechanism to perform only a single cycle of wiping action.

The controller circuit 19 calculates and processes the output signal S of the amplifier circuit 17 to output three kinds of signals (i.e., to switch a first output signal D1, a second output signal D2, and a third output signal D3 into the "ON" condition). Here, the "ON" condition means a high (H) level when it is positive in logic, while it turns to a low (L) level when negative, or "OFF".

In the controller circuit 19, first of all, the output signal S of the amplifier circuit 17 is compared with three preset voltage levels sequentially from the highest one, i.e., a first preset level R1, a second preset level R2, and a third preset level R3.

With the rain sensor 2 which is used in the present invention, as previously mentioned, the more the water drops are adhered to or present upon the outside surface of the front glass 1, the lower the output signal level of the light receiving element 15. Therefore, the voltage level of the output signal S is at a maximum when no water drops are adhered to nor present upon the surface of the front glass, while it is at a minimum when many water drops are adhered to or present thereupon. In other words, the amount or degree of water drops that are present is detected.

Further, when the output signal S of the amplifier circuit 17 is less or smaller than the first preset level R1 (S<R1), the first output signal is switched to the H level, whereas the second output signal D2 is switched to the H level when it is less or smaller than the second preset level R2 (S<R2), and further the third output signal D3 is switched to the H level when it is less or smaller than the third preset level R3 (S<R3).

Here, when the first output signal D1 is in the H level, it corresponds to a condition of drizzly or misty rain or a condition of light rain, when the second output signal D2 in the H level, it corresponds to a condition of mild rain, and when the third output signal D3 is in the H level, it corresponds to a condition of heavy rain. Note that although in this example the source of the water drops is given as rain, the water drops may come to be present on the front windshield from other sources, for example, from heavy fog.

The auxiliary driver circuit 21 makes the wiper driver circuit 20 output the wiper driving signal WD1 for driving the wiper by only one cycle when the time duration t of the wiper driving signal WD, measured from the time when the wiper driving signal WD turns ON (into the "ON" condition) after initiation of the wiper 9 to when it comes to be equal to or longer than a predetermined time T ($t \geq T$), irrespective of the level of the output signal of the rain sensor 2. The predetermined time T, for example, is preferably set to be around two (2) seconds, at the longest.

Further, the auxiliary driver circuit 21 is also able to make the wiper driver circuit 20 output the wiper driving signal WD1 for driving the wiper by only one cycle again, even in the case where the wiper 9 was once initiated and then has completed only one complete cycle due to there being only a small amount of rainfall, after the predetermined time T has elapsed from the initial completed cycle, irrespective of the level of the output signal of the rain sensor 2.

Figure 5:
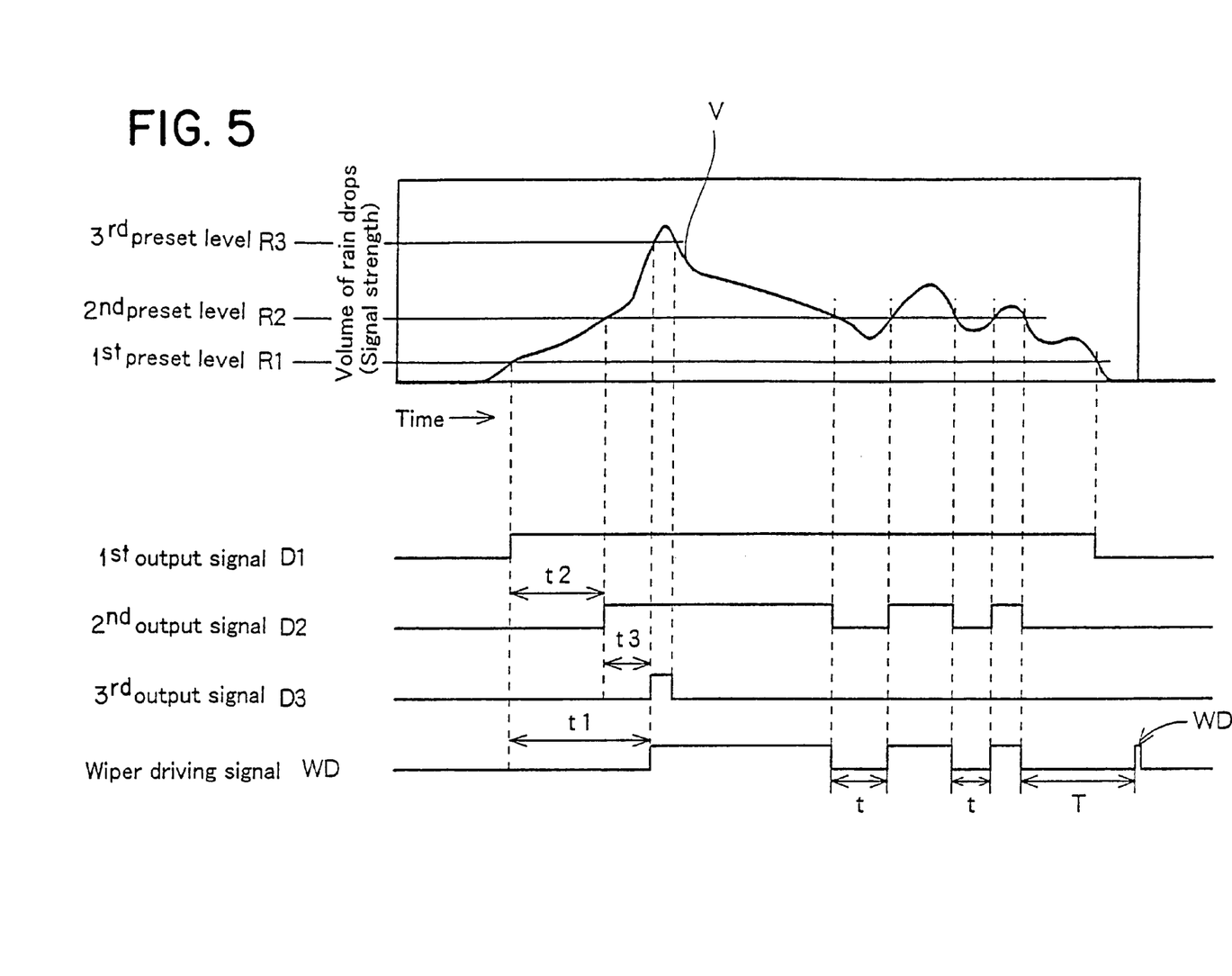
FIG. 5 shows a timing chart of the wiper controller apparatus of the water drop sensitive type according to the present invention.

The timing chart shown in FIG. 5 indicates the ON or OFF conditions of the output signals D1, D2 and D3 of the controller circuit 19 and the wiper driving signal WD with respect to changes in the amount V of water drops adhered to or present upon the front glass 1, during a time period starting from the time of initiating the wiper 9 when the rain starts to fall continuously thereafter until the time when the rain stops, in the case where the three kinds of output signals (the first output signal D1, the second output signal D2, and the third output signal D3) are produced by the controller circuit 19.

Since V shown in FIG. 5 indicates the variations in the amount of water drops adhered or present upon the front glass 1, it corresponds to the reversed output signal S of the amplifier 17.

As is shown in FIG. 5, when the rain starts, the volume or amount of water drops also begins to increase. Further, when the amount of water present reaches the first preset level R1, the first output signal D1 is switched to the H level, and when the amount V of the rain drops further rises to reach the second preset level R2, the second output signal D2 is switched to the H level. Furthermore, when the volume or amount V of the water drops rises to reach the third preset level R3, the third output signal D3 is switched to the H level.

Then, when all the output signals D1, D2 and D3 of the controller circuit 19 are switched to the H level, the wiper driving signal WD is outputted from the wiper driver circuit 20, and the wiper 9 starts to be driven.

In this instance, the driving of the wiper 9 can be started after ejection of a predetermined amount of window washer liquid onto the front glass 1 or together with the ejection thereof.

After that, even if the third output signal D3 is switched to the L level, the wiper driving signal WD continues to be outputted as long as the second output signal D2 maintains the H level, and the wiper driver circuit 20 stops outputting the wiper driving signal WD when the second output signal D2 is switched to the L level.

Accordingly, the wiper 9 starts to be driven when the third output signal D3 is switched to the H level, and is stopped when the second output signal D2 is switched to the L level.

However, as shown in FIG. 5, in the case where the first output signal D1 is maintained at the H level, the wiper 9 starts to be driven when the second output signal D2 is switched to the H level again even after it has already once been switched to the L level. If the first output signal D1 is maintained at the H level, the output condition of the wiper driving signal WD is determined depending upon that of the second output signal D2.

Further, as shown in FIG. 5, it is possible, by calculating the time difference t1 between the times when the first output signal D1 and the third output signal D3 are switched to the H level, to drive the wiper 9 at a high velocity if the time difference t1 is equal or less than a predetermined value T ($t1 \leq T$). This corresponds to a situation where the rain abruptly turns to heavy rain.

Moreover, as shown in FIG. 5, it is also possible, by calculating the time difference t2 between the times when the first output signal D1 and the second output signal D2 are switched to the H level, to drive the wiper 9 at the high velocity if the time difference t2 is equal or less than the predetermined value T2 ($t2 \leq T2$).

Furthermore, as shown in FIG. 5, it is also possible, by calculating the time difference t3 between the times when the second output signal D2 and the third output signal D3 are switched to the H level, to drive the wiper 9 at the high velocity if the time difference t3 is equal or less than the predetermined value T3 ($t3 \leq T3$).

Also, as shown in FIG. 5, the time duration t (the time of the "OFF" state or condition) of the wiper driving signal WD after being switched into the "ON" condition comes to be equal to or greater than a predetermined time T ($t \geq T$), and the wiper driving signal WD1 for driving the wiper by one cycle is outputted from the wiper driver circuit 20 irrespective of the level of the output signal of the rain sensor 2.

With this wiper driving signal WD1 for single cycle driving of the wiper, after the rain, it is possible to start driving the wiper 9 and to automatically wipe away remaining rain drops which are adhered to or present upon the front glass 1 in an amount or volume less than the corresponding second preset level R2, or which are adhered or present but not detected by the rain sensor 2 and that have slid down into the view area of the front glass 1 from areas other than the wiping area wiped by the wiper 9.

Further, even in a case where the wiper 9 has been initiated but is driven by only one wiping cycle, since the volume of the rain is small, the wiper 9 is further driven by one additional cycle again when the predetermined time T elapses after the completion of the initial single cycle irrespective of the level of the output signal of the rain sensor 2. Therefore, it is possible to automatically wipe away the rain drops adhered or present upon the front glass 1 in a volume or amount less than the second preset level R2 and to start driving the wiper 9.

Furthermore, by altering or changing the second preset level R2 as the preset voltage, the timing when the second output signal D2 is switched to the L level can be adjusted, thereby determining whether the front glass is to be wiped by the wiper , i.e., the time when the wiper 9 is to be stopped. However, the wiper 9 is driven again through the single cycle when the time duration t of the wiper driving signal WD comes to be equal to or greater than the predetermined time T irrespective of the level of the output signal of the rain sensor 2. Therefore, even small amounts of rain drops adhered to or present upon the front glass 1 can be automatically wiped away.

Figure 6:
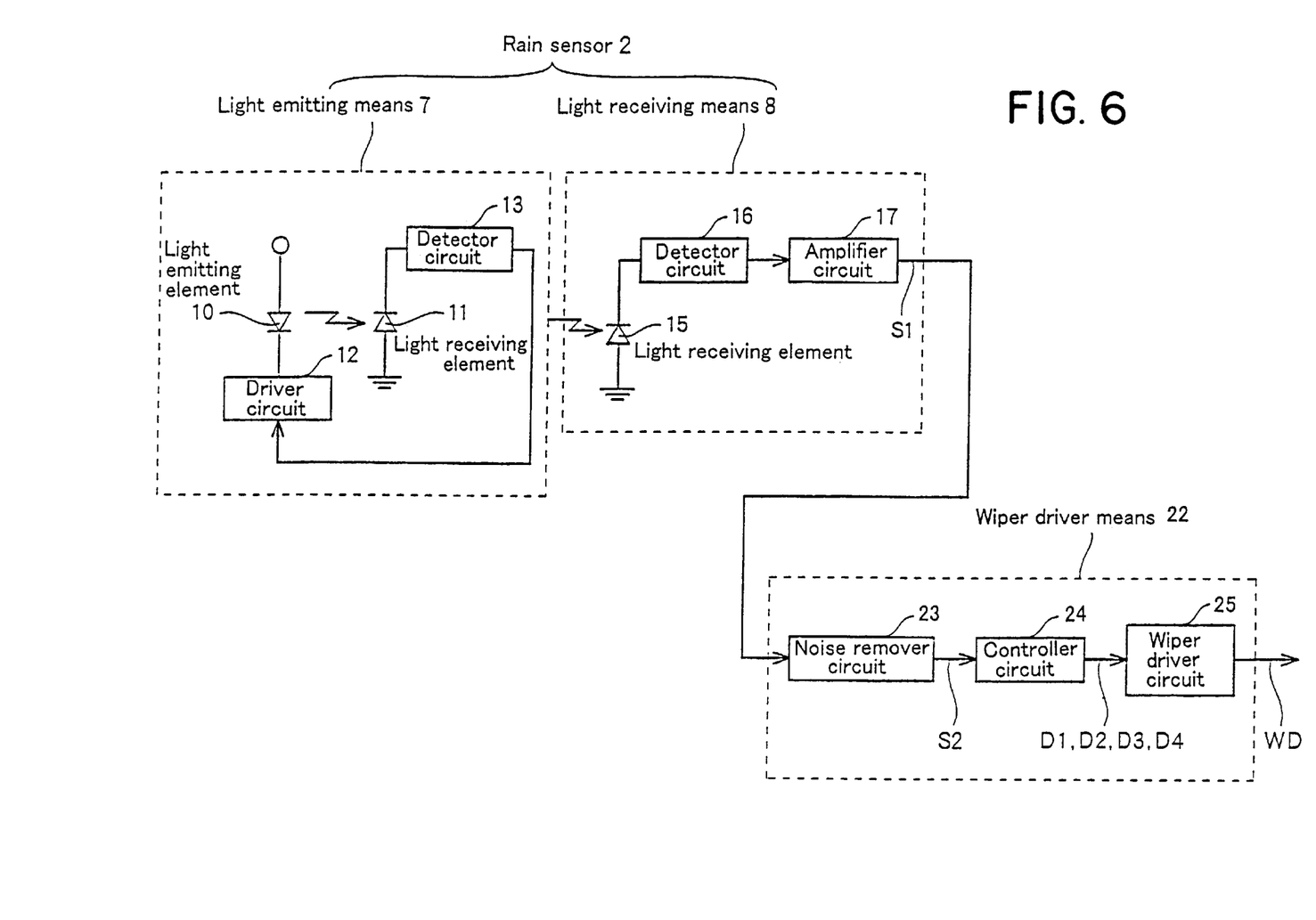
FIG. 6 shows another structure of the wiper controller apparatus of the water drop sensitive type according to the present invention; and, FIGS. 7 and 8 show the timing charts of the wiper controller apparatus shown in FIG. 6.

Next, the wiper controller apparatus of the water drop sensitive type according to the present invention, for the purpose of quickly responding to the situation of water drops becoming adhered to or present upon the window glass, free from any influence of ambient light, electromagnetic noise or the like from outside sources, which noise varies periodically, as shown in FIG. 6, comprises a rain sensor 2 including the light emitting means 7 for introducing the light into the front glass 1 so as to undergo total internal reflection upon the internal surface thereof, the light receiving means 8 for receiving the light reflected inside the front glass 1, and a wiper driver means 22 for driving the wiper or wipers 9 based upon the output signal of the light receiving means 8 at a desired velocity.

However, the rain sensor 2 has the same construction and function as that shown in FIG. 4.

The wiper driver means 22 comprises a noise remover or noise suppressor circuit 23 such as an integrator and so on, a controller circuit 24 for producing a desired signal from the output signal of the noise remover circuit 23, and a wiper driver circuit 25 which converts the output signal of the controller circuit 24 so as to output the wiper driving signal WD to the wiper driving mechanism (not shown in figure) for driving the wiper(s) 9 at the desired velocity.

The noise remover circuit 23 outputs a signal S2 only when the time duration (i.e., pulse width) of the output signal S1 of the amplifier circuit 17 exceeds a predetermined time T. Accordingly, the noise remover circuit 23 does not output the signal S2 with respect to any signal S1 which is less than the predetermined time T in signal duration time thereof.

The predetermined time T, in general, for responding to noise having a short signal duration time, is to be shorter than the driving frequency (cycle frequency) of the wiper (i.e., about 1 sec.) and is preferably longer than 0.3 sec. The predetermined time T can be preset by adjusting the time constant (CR) of the integrator circuit provided in the noise remover circuit 23.

Accordingly, if any periodically varying external ambient light or electromagnetic noise has a signal duration time of less than 0.3 sec. and falls onto the light emitting means 7, the wiper 9 will not be driven due to such noise since the noise remover circuit 23 removes those noise components and keeps them from being inputted into a lower stage of the circuitry, i.e., into the circuits 24 and 25.

The controller circuit 24 calculates and processes the output signal S2 of the noise remover circuit 23 so as to output the three kinds of signals (i.e., switches the first output signal D1, the second output signal D2, and the third output signal D3 into the "ON" condition). Here, the "ON" condition means a high (H) level if it is positive in logic, while it turns into a low (L) level when negative, or "OFF".

In the controller circuit 24, first of all, the output signal S2 of the noise remover circuit 23 is also compared with the three preset voltage levels, sequentially from the highest one, i.e., the first preset level R1, the second preset level R2, and the third preset level R3.

With the rain sensor 2 which is used in the present invention, as previously mentioned, the more the water drops are adhered to or present upon the outside surface of the front glass 1, the lower the output signal level of the light receiving element 15. Therefore, the voltage level of the output signal S2 is at a maximum when no water drops are adhered to nor present upon the surface of the front glass, while it is at a minimum when many water drops are adhered to or present thereupon.

Further, when the output signal S2 of the noise remover circuit 23 is less or smaller than the first preset level R1 (S2<R1), the first output signal is switched to the H level, whereas the second output signal D2 is switched to the H level when it is less or smaller than the second preset level R2 (S2<R2), and further the third output signal D3 is switched to the H level when it is less or smaller than the third preset level R3 (S2<R3).

Here, when the first output signal D1 is at the H level, this corresponds to a condition of drizzly or misty rain or a condition of light rain, when the second output signal D2 in the H level, this corresponds to a condition of medium rain, and when the third output signal D3 in the H level, this corresponds to a condition of heavy rain.

Figure 7:
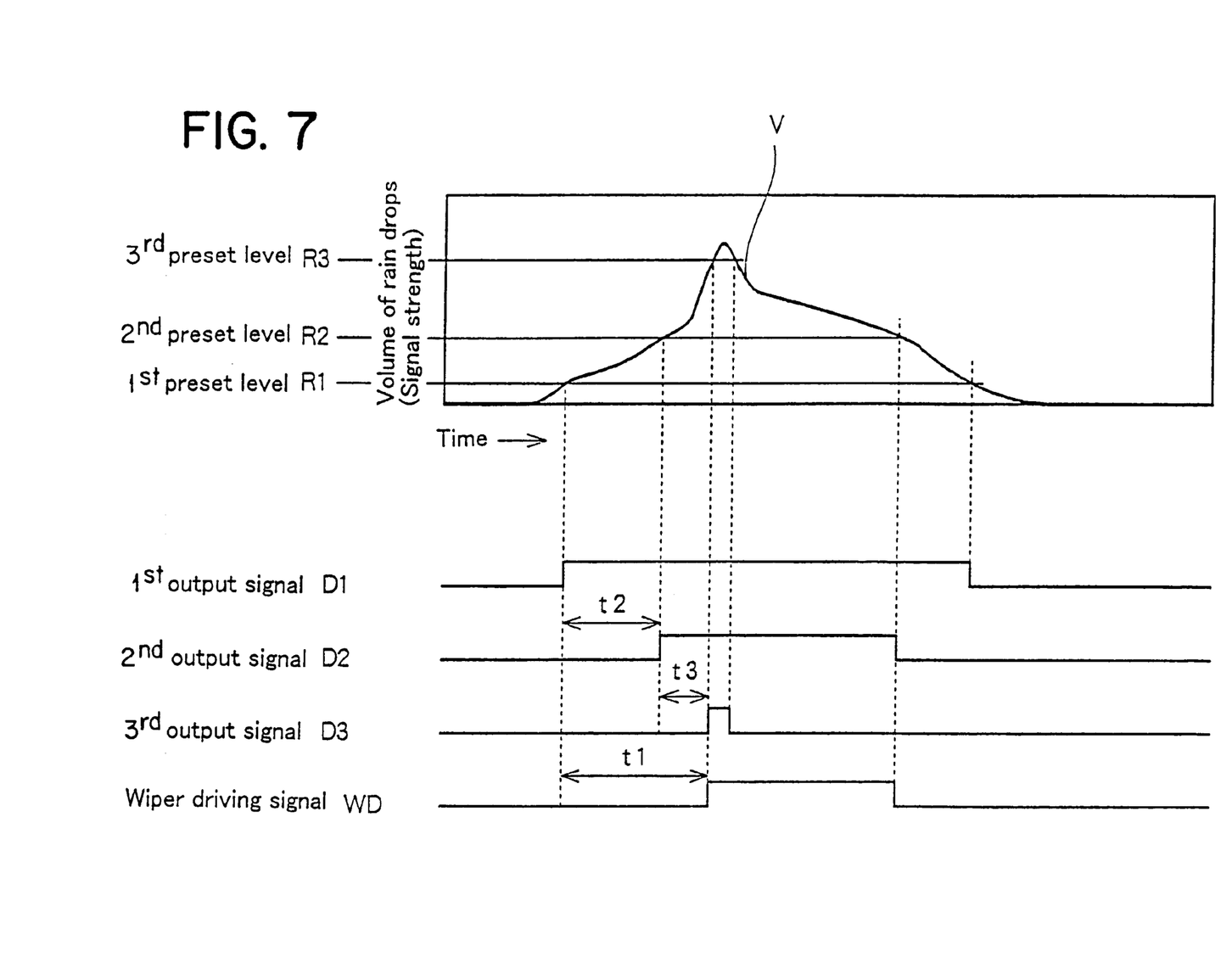

The timing chart shown in FIG. 7 also indicates the ON or OFF conditions of the output signals D1, D2, and D3 of the controller circuit 24 and the wiper driving signal WD with respect to changes or variations in the volume or amount V of water drops adhered to or present upon the front glass 1, during a time period starting from initiation of the wiper 9 when rain starts falling continuously thereafter until the time when the rain stops, in the case where the three kinds of output signals (the first output signal D1, the second output signal D2, and the third output signal D3) are produced by the controller circuit 24.

Also, since V shown in FIG. 7 indicates the changing volumes or amounts of rain drops adhered to or present upon the front glass 1, it corresponds to the reversed output signal S2 of the noise remover circuit 23.

As is shown in FIG. 7, when the rain starts, the volume or amount of water drops also begins to increase. Further, when the amount of water drops reaches the first preset level R1, the first output signal D1 is switched to the H level, and when the volume V of the rain drops further increases to reach the second preset level R2, the second output signal D2 is switched to the H level. Furthermore, when the amount V of water drops increases to reach the third preset level R3, the third output signal D3 is switched to the H level.

Then, when all the output signals D1, D2, and D3 of the controller circuit 24 are switched to the H level, the wiper driving signal WD is outputted from the wiper driver circuit 25, and the wiper 9 starts to be driven.

In this instance, the driving of the wiper 9 can also be started after ejection of a predetermined amount of window washer liquid onto the front glass 1 or together with the ejection thereof.

After that, even if the third output signal D3 is switched to the L level, the wiper driving signal WD continues to be outputted as long as the second output signal D2 is maintained at the H level, and the wiper driver circuit 25 stops outputting of the wiper driving signal WD when the second output signal D2 is switched to the L level.

Accordingly, the wiper 9 starts to be driven when the third output signal D3 is switched to the H level, and is stopped when the second output signal D2 is switched to the L level.

Further, as shown in FIG. 7, it is possible, by calculating the time difference t1 between the times when the first output signal D1 and the third output signal D3 are switched to the H level, to drive the wiper 9 at a high velocity if the time difference t1 is equal or less than a predetermined value T (t1≦T). This indicates or corresponds to a situation wherein the rain has abruptly changed to heavy rain.

Moreover, as shown in FIG. 7, it is also possible, by calculating the time difference t2 between the times when the first output signal D1 and the second output signal D2 are switched to the H level, to drive the wiper 9 at the high velocity if the time difference t2 is equal or less than a predetermined value T2 (t2≦T2).

Furthermore, as shown in FIG. 7, it is also possible, by calculating the time difference t3 between the times when the second output signal D2 and the third output signal D3 are switched to the L level, to drive the wiper 9 also at the high velocity if the time difference t3 is equal or less than a predetermined value T3 (t3≦T3).

Also, by altering or changing the second preset level R2 as the preset voltage, the time when the second output signal D2 is switched to the H level can be adjusted, thereby determining whether the front glass is still to be wiped by the wiper, i.e., the time when the wiper 9 to be stopped.

Figure 8:
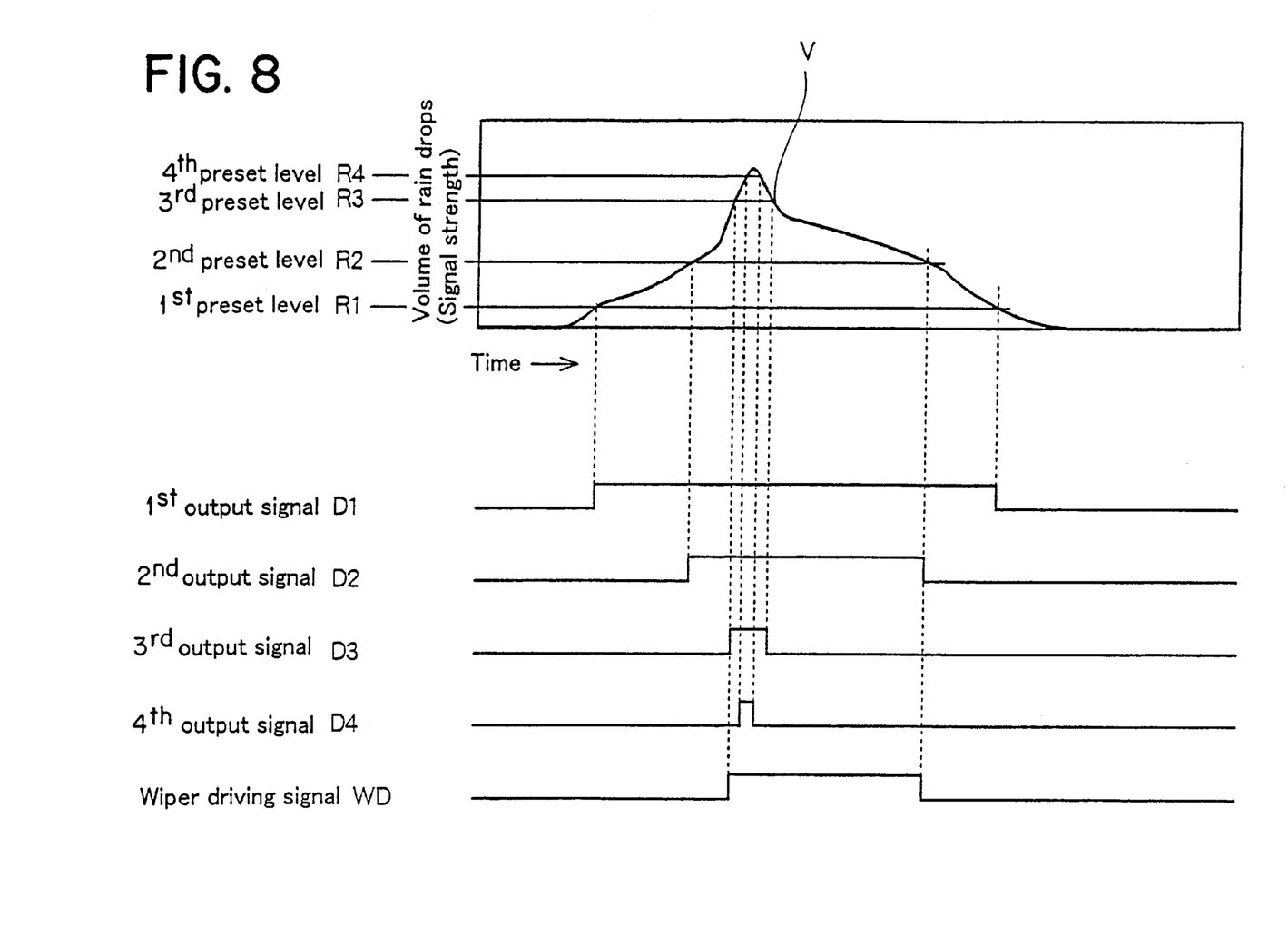

Next, an explanation will be given of a case where the controller circuit 24 produces four (4) kinds of output signals (a first output signal D1, a second output signal D2, a third output signal D3, and a fourth output signal D4) so as to control the wiper(s) 9.

In the controller circuit 24, the output signal S2 of the noise remover circuit 23 is compared with four preset voltage levels, sequentially from the highest one, i.e., the first preset level R1, the second preset level R2, the third preset level R3, and the fourth preset level R4.

When the output signal S2 of the noise remover circuit 23 is less or smaller than the first preset level R1 (S2<R1), the first output signal D1 is switched to the H level, whereas the second output signal D2 is switched to the H level when it is less or smaller than the second preset level R2 (S2<R2), the third output signal D3 is switched to the H level when it is less or smaller than the third preset level R3 (S2<R3), and further the fourth output signal D4 is switched to the H level when it is less or smaller than the fourth preset level R4 (S2<R4).

Here, the case where the first output signal D1 to the third output signal D3 are at the H level corresponds to the rain conditions mentioned above, and the case where the fourth output signal D4 is switched to the H level corresponds to a situation where the rain is falling harder than that of the case where the third output signal is at the H level.

The timing chart shown in FIG. 8 indicates the ON or OFF conditions of the output signals D1, D2, D3, and D4 of the controller circuit 24 and the wiper driving signal WD with respect to changes or variations in the volume or amount V of water drops adhered to or present upon the front glass 1, during a time period starting from initiation of the wiper 9 when the rain starts to fall continuously thereafter until the time when the rain stops, in the case where the four kinds of output signals (the first output signal D1, the second output signal D2, the third output signal D3, and the fourth output signal D4) are produced by the controller circuit 24.

Further, since V shown in FIG. 8 indicates the changing volumes or amounts of rain drops adhered to or present upon the front glass 1 in the same manner as in FIG. 7, it corresponds to the reversed output signal S2 of the noise remover circuit 23.

As is shown in FIG. 8, when the rain starts, the volume or amount of water drops also begins to increase. Further, when the volume or amount of water drops reaches the first preset level R1, the first output signal D1 is switched to the H level, when the amount V of rain drops further increases to reach the second preset level R2, the second output signal D2 is switched to the H level, and when the volume V of rain drops further reaches to the third preset level R3, the third output signal D2 is switched to the H level. Furthermore, when the quantity V of the water drops increases up to reach the fourth preset level R4, the fourth output signal D4 is switched to the H level.

Then, if all the output signals D1, D2, D3, and D4 of the controller circuit 24 are switched to the H levels, the wiper driving signal WD is outputted from the wiper driver circuit 25, and the wiper 9 starts to be driven.

In this instance also, the driving of the wiper 9 can be started after ejection of a predetermined amount of window washer liquid onto the front glass 1 or together with the ejection thereof.

Further, when the fourth output signal D4 is switched to the H level, the wiper 9 is driven at a high velocity. After that, the wiper driving signal WD continues to be outputted as long as the second output signal D2 is at the H level, even if the third output signal D3 is switched to L level, and when the second output signal D2 is switched to the L level, the wiper driver circuit 21 stops outputting of the wiper driving signal WD.

Accordingly, the wiper 9 starts to be driven when the third output signal D3 is switched to the H level, and is stopped when the second output signal D2 is switched to the L level.

Further, the wiper is driven at a high velocity when the fourth output signal D4 is maintained at the H level.

Furthermore, by altering or changing the second preset level R2 as the preset voltage, the timing when the second output signal D2 is switched to the L level can be adjusted, thereby determining whether the front glass is to be wiped by the wiper based on the time when the wiper 9 is stopped.

However, application of the wiper controller apparatus of the water drop sensitive type according to the present invention should not be limited only to the front glass (windshield) 1 of an automobile as mentioned above. I can also be applied to a rear window glass thereof, or to the window glass of any other vehicle or structure that is exposed to the elements (rain, fog, etc.).

What is claimed is:

1. A wiper controller apparatus, comprising:
   a light emitter, constructed and arranged to emit light into a window glass so as to undergo total internal reflection within said window glass;
   a light receiver, constructed and arranged to receive the light which has undergone total internal reflection within said window glass;
   a detector, constructed and arranged to detect the amount of water present upon an outside surface of said window glass based on an output signal of said light receiver, and to provide a wiper driving signal to drive a wiper thereupon; and
   a wiper driver, constructed and arranged to receive the wiper driving signal and to drive said wiper again by only one cycle, in a case where said wiper has first been driven by only one cycle, when a predetermined time has passed after said first cycle thereof.

* * * * *